(12) United States Patent
Jones et al.

(10) Patent No.: US 6,392,598 B1
(45) Date of Patent: May 21, 2002

(54) CABLE PHASE CALIBRATION IN A TCAS

(75) Inventors: James B. Jones, Carnation; Ruy C. Brandao, Redmond, both of WA (US); Ruy L. Brandao, Fort Lauderale, FL (US); Rand Ringwald, Newcastle, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/570,100

(22) Filed: May 12, 2000

Related U.S. Application Data

(60) Provisional application No. 60/179,454, filed on Feb. 1, 2000.

(51) Int. Cl.$^7$ .................................................. G01S 5/04
(52) U.S. Cl. .......................... 342/442; 342/174; 342/445
(58) Field of Search .................................. 342/442, 445, 342/446, 174

(56) References Cited

U.S. PATENT DOCUMENTS

| | | | |
|---|---|---|---|
| 4,855,748 A | 8/1989 | Brandao et al. | 342/455 |
| 5,373,236 A | 12/1994 | Tsui et al. | 324/76.42 |
| 5,541,608 A | 7/1996 | Murphy et al. | 342/442 |
| 5,815,117 A | 9/1998 | Kolanck | 342/442 |
| 6,169,519 B1 * | 1/2001 | Holecek et al. | 342/442 |

* cited by examiner

*Primary Examiner*—Theodore M. Blum

(57) ABSTRACT

An apparatus and method determining angle-of-arrival of a received radio frequency signal, and apparatus and method for calibrating the angle-of-arrival determining apparatus.

46 Claims, 4 Drawing Sheets

CABLE PHASE CALIBRATION IN A TCAS

This application claims the benefit of U.S. Provisional Application Ser. No. 60/179,454, filed in the names of James B. Jones, Ruy C. Brandao, Ruy L. Brandao and Rand E. Ringwald on Feb. 1, 2000, the complete disclosure of which is incorporated herein by reference.

FIELD OF THE INVENTION

The present invention relates to a direction finding antenna system. More particularly, it relates to cable calibration of a four-element array of the interferometer type particularly suited for determining the relative bearing of an intruding aircraft from a protected aircraft in conjunction with the Traffic Alert Collision Avoidance System (TCAS).

BACKGROUND OF THE INVENTION

Traffic Alert and Collision Avoidance Systems ("TCAS") are a well-known means for protecting aircraft in flight from other aircraft, commonly referred to as intruding aircraft, in the vicinity of the protected aircraft. During flight, TCAS equipment located aboard a protected aircraft periodically transmits interrogation signals. Such interrogations may occur at a rate between 38 and 200 per second, depending upon traffic conditions. These interrogations are received by Air Traffic Control Radar Beacon Systems ("ATCRBS") or Mode Select ("Mode S") altitude reporting transponders located aboard intruder aircraft. The transponder aboard the intruding aircraft transmits a reply signal which reports its altitude. The TCAS equipment computes the range of the intruding aircraft by using the round-trip time between the transmission of the interrogation and the receipt of the reply.

Altitude, altitude rate, range and range rate are determined by tracking replies to successive interrogation signals. These data are used to determine whether the intruding aircraft is a threat. If threat detection logic in the TCAS computer determines that an intruder aircraft presents a potential collision or near-miss encounter, computer threat resolution logic determines an appropriate vertical maneuver, such as climb, dive, or maintain altitude, that will ensure the safe vertical separation and minimum deviation from the protected aircraft's current vertical rate.

The TCAS described in document RTCA/DO-185 MINIMUM OPERATIONAL PERFORMANCE STANDARDS FOR TRAFFIC ALERT AND COLLISION AVOIDANCE SYSTEM, published September, 1983, by the Radio Technical Commission for Aeronautics, Washington, D.C., provides advisories only for vertical maneuvers of the protected aircraft to escape collision with an intruder aircraft. An improved TCAS has been demonstrated to provide additional advisories for horizontal turning maneuvers, thereby improving collision avoidance. Improved TCAS requires knowledge of the bearing of the intruding aircraft relative to the protected aircraft, in addition to the other data collected by TCAS.

Various antenna systems have been devised for determining relative bearing of an intruder aircraft. For example, U.S. Pat. No. 4,414,550 entitled LOW PROFILE CIRCULAR ARRAY ANTENNA, issued to Tresselt on issued Nov. 8, 1983, discloses an eight element circular array antenna with direction finding capability by virtue of a Butler beam forming matrix used in conjunction therewith. An antenna of this type has been used successfully in the improved TCAS to determine relative bearing of intruding aircraft.

In another example, U.S. Pat. No. 3,792,472, entitled Warning Indicator To Alert Aircraft Pilot Presence And Bearing Of Other Aircraft, issued to Payne et al on Feb. 12, 1974, discloses a five element antenna system for receiving standard ATCRBS reply signals from intruding aircraft and providing approximate relative bearing. Payne et al utilizes an antenna having four elements spaced at 90-degree intervals about the circumference of a circle with a fifth element at its center. The bearing of an intruding aircraft is determined, within an accuracy of +/−22.5-degree, by individually comparing the phases of the signals received by the circumferential elements with that of the signal received by the center element.

The TCAS disclosed in U.S. Pat. No. 4,855,748, entitled TCAS Bearing Estimation Receiver Using A 4 Element Antenna, issued to Brandao et al on Aug. 8, 1989, the complete disclosure of which is incorporated herein by reference, utilizes an interferometer array to determine relative bearing of an intruder aircraft. Briefly, the Brandao et al patent discloses using the phase difference between antenna elements of an incoming transponder radio frequency ("RF") reply to measure bearing angle of the reply, commonly referred to as the relative angle of arrival ("AOA"). When an interferometer array is used to determine bearing angle, the phase errors of the measurement means cannot be ignored. Such phase errors cannot be entirely accounted for by factory calibration of the equipment, since the phase errors change with the age, temperature and other variables of the equipment. One error source is the difference in the phase delay through the receiver channels supplying inputs to the phase detector. Above incorporated U.S. Pat. No. 4,855,748 describes a TCAS receiver calibration that overcomes this receiver pair phase delay error.

Differences between the phase delays of transmission lines may also produce significant errors in the outputs of the analog phase detectors. U.S. Pat. No. 4,855,748 also describes a TCAS cable calibration that overcomes the problem of correcting for the difference in phase delay the transmission lines by injecting isophase signals from a test oscillator operating at the nominal transponder transmission frequency of 1090 MHz into each of the dipole antenna elements. However, current aircraft interferometer array installations still require the antenna cables to be phase matched within ½ wavelength in order to accurately measure the transponder reply signal AOA. Phase matching the cables minimizes phase measurement errors caused when the transponder reply frequency differs from the TCAS calibration frequency within the allowable variation of +/−3 Mhz. Cable phase matching leads to higher installation costs and higher maintenance costs when cables are repaired or replaced. Thus, eliminating the need for antenna cable phase matching in an interferometer array is desirable.

Furthermore, inaccuracies inherent in the analog phase detectors of the system are additional sources of error in the bearing angle measurement. In U.S. Pat. No. 4,855,748, these inherent inaccuracies are accounted for by calibrating the phase detectors at system power-up and periodically thereafter during operation. Samplings of the phase detector outputs during calibration provide data for a look-up table used to correct the bearing measurement output of the phase detectors for the entire angular range of the detectors.

SUMMARY OF THE INVENTION

Briefly, the invention comprises a direction finding receiving system on a protected aircraft in which a signal from an ATCRBS transponder on an intruder aircraft is received by a four-element interferometer type antenna array. The antenna elements are disposed in two pairs along perpendicular axes, with the axis of one pair preferably aligned with the heading axis of the aircraft. Each element of the array is connected to an individual receiver, the outputs of which are connected to a broadband digital phase detector.

According to the invention, the broadband digital phase detector is used to calibrate the transmission channels, including the antenna cables and receivers, at the nominal and extremes of the allowable transponder reply frequency variation. When implemented in a TCAS, the nominal transponder reply frequency is 1090 MHz and the extremes of the allowable transponder reply frequency variation are 1087 MHz and 1093 Mhz, respectively. From this calibration data the phase correction at all frequencies from 1087 MHz to 1093 Mhz is calculated.

The invention also uses a frequency discriminator to measure the frequency of each transponder RF reply, and uses this frequency to select the proper phase correction to be used for that reply. The difference in phase between adjacent samples of the digital phase detector is measured and used to determine the frequency. The invention results in a more accurate angle of arrival measurement versus frequency and negates the need for antenna cable phase matching and receiver phase matching.

According to one aspect of the invention, the invention provides a direction finding antenna system capable of determining the relative bearing of a received signal. The system includes a four-element interferometer-type antenna system with each antenna element coupled to a corresponding receiver that amplifies, converts, and limits the signal received thereon and outputs a 48 MHz intermediate frequency (I.F.) output signal. The outputs of the respective receivers are coupled to respective analog-to-digital converters. The analog-to-digital converters output sequential intermediate frequency signal samples of the received signal. The outputs of the individual analog-to-digital converters are simultaneously applied to different variable phase input ports of a digital phase detector. The digital phase detector also includes a reference phase input port that is coupled to a reference phase generator to receive a reference phase output signal thereof. The digital phase detector generates I and Q data by comparing the reference phase against the signals received by respective antenna elements. The I and Q data are output to a processor, such as a microprocessor. The processor includes a frequency discriminator that compares sequential output signals of respective analog-to-digital converters and determines a frequency of each of the output signals. The processor determines phase corrected values of the I and Q data and determines an angle of arrival of the received signal as a function of the phase corrected values.

According to another aspect of the invention, the direction finding antenna system includes a synthesizer that generates various calibration signals at different frequencies in response to a command from the microprocessor. The direction finding antenna system also includes a transmitter coupled to the synthesizer and to one of the antenna elements. The transmitter injects a calibration signal into the antenna element.

According to another aspect of the invention, a switch under the control of the microprocessor is coupled to the transmitter and each of the antenna elements in such manner that the calibration signals are alternately applied to different antenna elements.

According to still another aspect of the invention, the direction finding antenna system includes an input memory coupled to the processor and having correction data stored therein. The processor accesses the correction data to determine the phase corrected values of the I and Q data. The correction data stored in the input memory is preferably accessed by the processor as a function of the frequency of the receiver output signals.

According to various aspects of the invention, the correction data further includes either one or more correction factors, or one or more phase corrected values. Preferably, the calibration signals include at least a first signal having a low frequency relative to a nominal value of the received signal and a second signal having a high frequency relative to that nominal value. The low frequency further is preferably a minimum of an allowable range of received signal frequency values and the high frequency further is preferably a maximum of the allowable range of received signal frequency values. When practiced in a Traffic Alert Collision Avoidance System, the minimum and maximum of an allowable range of received signal frequency values are 1087 MHz and 1093 MHz, respectively.

According to various other aspects of the invention, a method for using a direction finding antenna system for determining the relative bearing of a received signal is provided. The method includes receiving a signal into each of four spaced apart antenna elements mounted in cruciform configuration. The receivers amplifying, converting and limiting the received signal and forming an analog intermediate frequency output signal therefrom. Using analog-to-digital converters to convert the analog intermediate frequency output signal into a digital intermediate frequency output signal and outputting sequential samples of the digital intermediate frequency output signal. In a digital phase detector, comparing the phase of the digital intermediate frequency output signal samples with a reference phase to form in-phase and in-quadrature data therefrom. Determining a frequency of the digital intermediate frequency output signal samples with a frequency detector. In a microprocessor, determining phase corrected values of the in-phase and in-quadrature data, and determining a first quantity related to the relative bearing to the received signal as a function of the phase corrected values. The referenced quantity being an angle-of-arrival of the received signal to the antenna system.

According to various aspects of the method of the invention, determining phase corrected values of the in-phase and in-quadrature data further includes accessing a stored file of correction data, preferably as a function of the frequency of the digital intermediate frequency output signal samples. According to one aspect of the invention, the phase corrected values of said in-phase and in-quadrature data is determined by arithmetically combining predetermined correction data with the in-phase and in-quadrature data formed from the digital intermediate frequency output signal samples and reference phase. Alternatively, according to another aspect of the invention, the phase corrected values of said in-phase and in-quadrature data is determined by substituting correction data that includes alternative predetermined in-phase and in-quadrature data having the phase corrections included therein.

According to still other aspects of the invention, a method is provide for calibrating a direction finding antenna system capable of determining the relative bearing of a received signal. The calibration method of the invention includes injecting a calibration signal into one of the of antenna elements, and receiving the calibration signal into others of the antenna elements. A receiver is used for amplifying, converting and limiting the received calibration signal, and for forming an analog intermediate frequency output signal therefrom. Analog-to-digital converters coupled to each receiver convert the analog intermediate frequency output signal into respective digital intermediate frequency output signals, and under the command of a microprocessor, output sequential samples of the respective digital intermediate frequency output signals. A frequency detector determines the frequency of respective digital intermediate frequency output signal samples. A digital phase detector is used for comparing the phase of the digital intermediate frequency output signal samples with a reference phase to form in-phase and in-quadrature data therefrom. The microprocessor determines phase correction data corresponding to the in-phase and in-quadrature data and stores the same in an input memory coupled thereto.

According to one aspect of the method of the invention for calibrating a direction finding antenna system, the storing of phase correction data further includes storing the phase correction data as a function of the corresponding intermediate frequency.

According to one aspect of the calibration method of the invention, the injecting of a calibration signal includes injecting multiple calibration signals. Preferably, the calibration signals include at least a minimum and a maximum of an allowable range of frequencies of the received signal.

According to another aspect of the calibration method of the invention, the of a calibration signal also includes alternately injecting the calibration signal into two or more different antenna elements.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is a method and apparatus for calibration of antenna cables in an four-element interferometer-type antenna array. The present invention also presents a phase corrected four-element interferometer-type antenna array for use, for example, in conjunction with a Traffic Alert Collision Avoidance System (TCAS).

Figure 1:
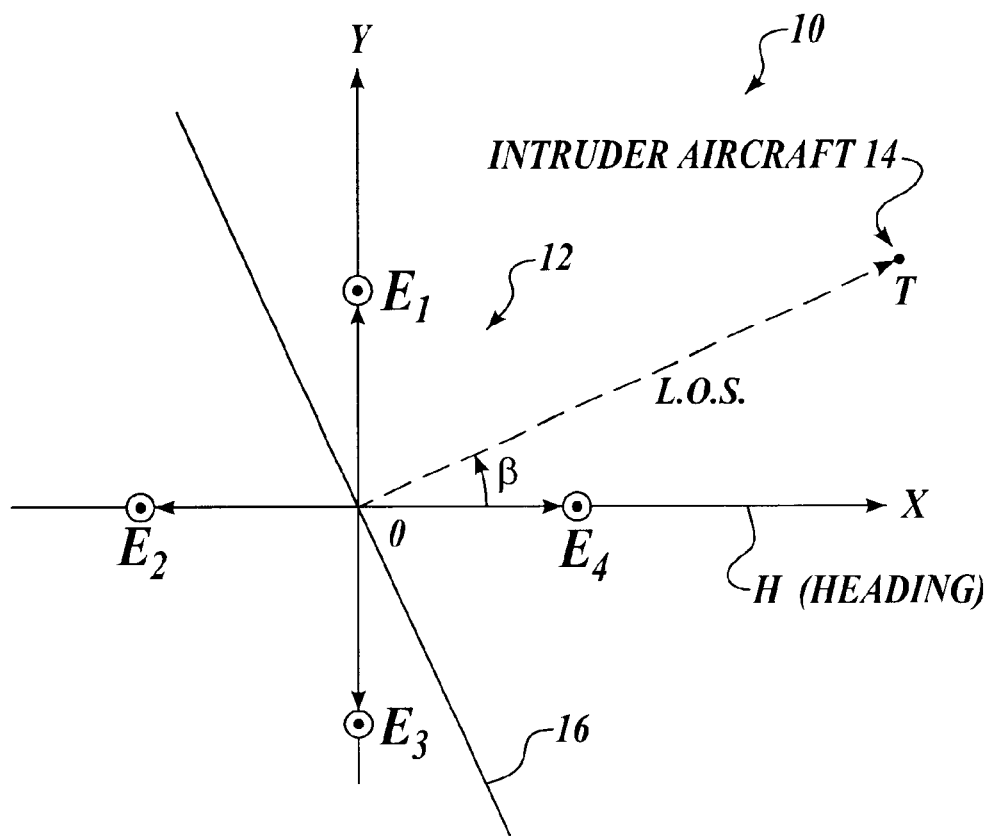
FIG. 1 illustrates the operation of a four-element interferometer-type antenna array in determining the relative bearing to a distant transmitter.

FIG. 1 illustrates the operation of a four-element interferometer-type antenna array in determining the relative bearing to a distant transmitter. The operations are explained in detail in above incorporated U.S. Pat. No. 4,855,748. Briefly, a direction finding receiving system 10 includes a four-element interferometer-type antenna array 12, which includes four antenna elements E1 through E4. Elements E2 and E4 are located on an axis H, which is preferably aligned with the heading axis of the aircraft. Elements E1 and E3 are located on an axis Y, which intersects axis H perpendicularly. Elements E1 through E4 are each spaced equal distances, preferably one-quarter wavelength, from the intersection O of axes H and Y. A transponder on an aircraft 14 located at T radiates electromagnetic waves along the line-of-sight (LOS) between the array center O and point T. A plane wavefront 16 of the radiation from the transponder from aircraft 14 at point T is shown arriving at the center of the array axes. Wavefront 16 is perpendicular to the LOS, and is an arbitrary phase of the transmitted radiation to which the phases of signals received by array elements E1 through E4 are referenced. The relative bearing from the protected aircraft upon which array 12 is located and distant aircraft 14 is the angle beta $\beta$ between H and LOS.

Each antenna element E1 through E4 receives a signal from distant source 14. The phase difference between a signal from distant source 14 arriving at first element E1 and the signal arriving at third element E3 is proportional to the sine of beta. The phase difference between the signal arriving from the same source at second element E2 and at fourth element E4 is proportional to the cosine of beta. The relative bearing, i.e., the angle beta, also known as the angle of arrival (AOA), from the protected aircraft to an intruding aircraft is determined by measuring the phase difference between signals of the first element pair E1 and E3, measuring the phase difference between signals of the second element pair E2 and E4, and from these measurements deriving the angle beta, the signal AOA. The phase of the signal received by any of the four elements E1 through E4 referenced to center O of antenna array 12 is the distance along the LOS, proportional to 2pi times the wavelength, lambda, that a plane wave impinging on the element must travel to reach center O of array 12, or must travel from array center O to impinge upon the element. The signals from first and third elements E1 and E3 are phase detected to provide a d.c. output proportional to a constant times the sine of beta. Similarly, the signals from second and fourth elements E2 and E4 are phase detected to provide a d.c. output proportional to a constant times the cosine of beta. The quotient of the phase detector outputs is obtained, and a look-up table is accessed to determine the value of the angle beta, the AOA. As shown in U.S. Pat. No. 4,855,748, a difference in elevation between the TCAS aircraft and the intruder merely reduces the amplitude of the phase detector outputs without otherwise affecting the measurement of the bearing angle beta.

Figure 2:
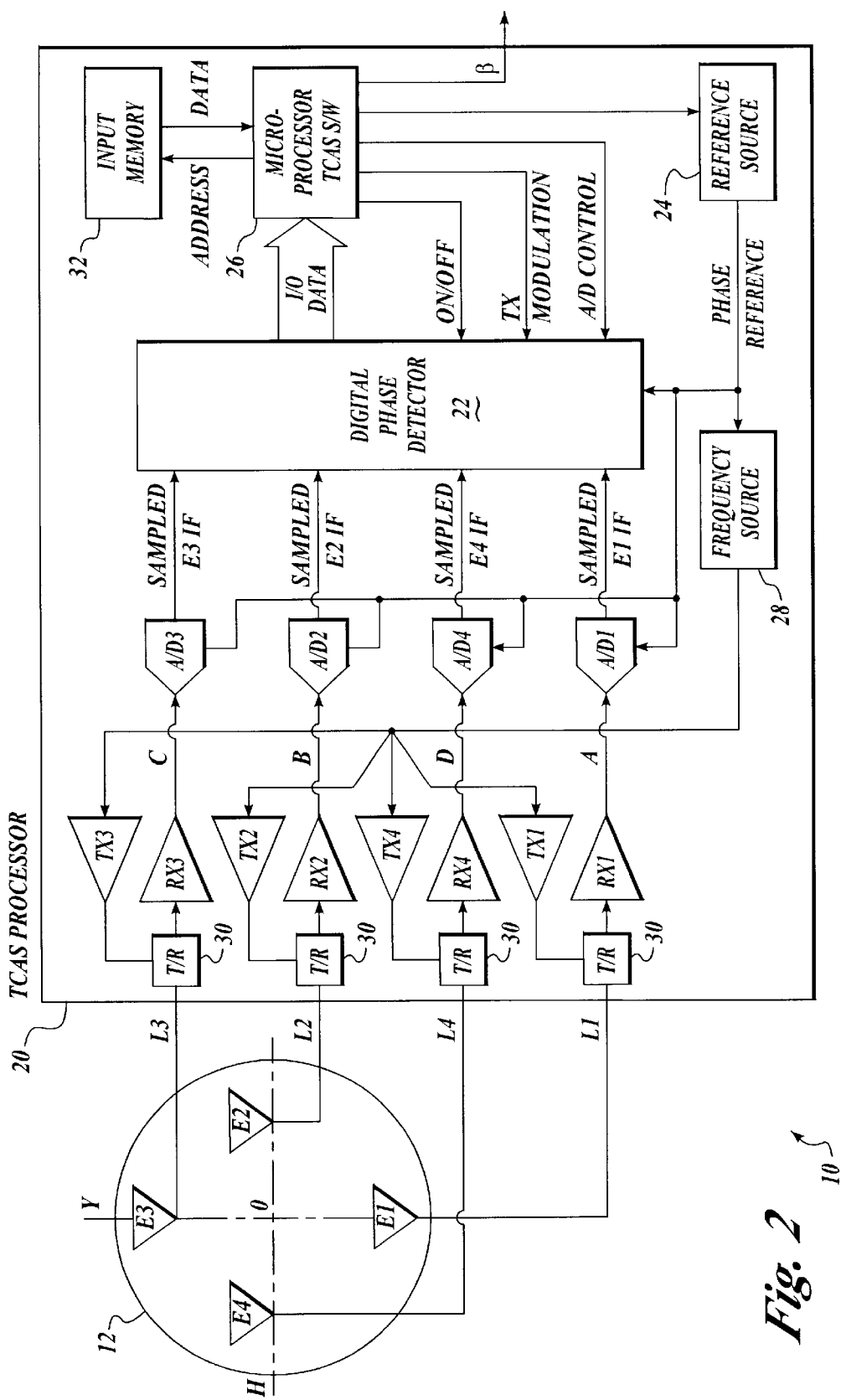
FIG. 2 is an illustrative block diagram of the direction finding receiving system of the invention, which utilizes a four-element interferometer-type antenna array.

FIG. 2 illustrates a block diagram of the direction finding receiving system 10 of the invention, which utilizes a four-element interferometer-type antenna array 12. When practiced in a Traffic Alert Collision Avoidance System (TCAS) installation, the four-element interferometer-type antenna array 12 of a direction finding receiving system 10 receives a reply signal from an ATCRBS transponder on an intruder aircraft. Antenna elements E1 through E4 are disposed in two pairs along perpendicular axes, with the axis of one pair preferably aligned with the heading axis H of the protected aircraft. The elements of one pair, first and third elements E1 and E3, respectively, are aligned on first axis Y which is perpendicular to axis H of the other element pair, second and fourth elements E2 and E4, respectively. Elements E1 through E4 are each spaced equal distances, preferably one-quarter wavelength, from the intersection O of perpendicular axes Y and H. Each element E1 through E4 of the array is connected through a respective transmission line L1 through L4 to the TCAS processor 20 at the input of a respective individual receiver RX1 through RX4. Each receiver RX1 through RX4 is a conventional RF receiver, including circuitry (commonly known in the art but not shown) that results in a 48 MHz intermediate frequency (I.F.) output signal. The outputs of receivers RX1 through RX4 are connected through respective analog-to-digital converters A/D1 through A/D4, thereby forming respective channels A, B, C and D.

The digitally sampled I.F. signal is applied to the variable phase input of digital phase detector 22, while a reference phase from a source 24 is applied to the reference phase input. Each respective analog-to-digital converter A/D1 through A/D4 outputs digitally sampled I.F. signals in response to a signal from phase reference source 24. The digitally sampled I.F. output signals are simultaneously applied to the variable phase inputs of digital phase detector 22. Digital phase detector 22 compares the phase of each digitally sampled I.F. signal to the reference phase and produces a d.c. output, I, proportional to the component of the variable phase input signal which is in-phase with the reference phase input signal. Digital phase detector 22 also produces a d.c. output, Q, proportional to that component of the variable phase input signal which is in-quadrature to the reference phase input signal. The output of digital phase detector 22 is a sequence of linearly spaced samples of the raw in-phase and in-quadrature (I/Q) data to the system microprocessor 26.

Multiple I and Q samples from digital phase detector 22 are sampled, averaged, and applied to microprocessor 26, which operates the TCAS software algorithms. Microprocessor 26 includes a frequency discriminator (not shown) which measures the rate of change of phase relative to time to determine the frequency of the received transponder reply signal. The difference in phase between adjacent samples of digital phase detector 22 is measured versus time and used to determine the transponder reply frequency. Thus, the frequency discriminator measures the frequency of the received signal. If the received reply signal is in phase with the reference phase, the signal is frequency at the nominal 1090 MHz and no correction is required. If, however, the frequency of the received transponder reply differs from the nominal 1090 MHz, within the above mentioned allowable +/−3 MHz variation, the signal is out of phase with the reference phase and must be corrected to ensure the accuracy of the AOA calculation. The measured frequency of the received signal is used to select a phase correction from a look-up table of correction factors, and the correction is applied to that reply. The correction factors are developed during a calibration sequence described below.

Transmission Channel Phase Delay Correction Factors

As noted above, differences between the phase delays of transmission line pairs and, to a lesser degree, receiver pair phase differences may produce significant errors in the outputs of digital phase detector 22. According to the present invention, such transmission line phase delay differences are determined and corrected during a transmission channel calibration sequence. Furthermore, minimal and/or constant receiver pair phase differences, which appear as additional phase offsets in the transmission lines, are also corrected during the transmission channel calibration sequence. The inherently linear nature of previously unavailable digital phase detectors eliminates any need for a calibration sequence, which was used in earlier systems to overcome the inaccuracy inherent in conventional analog phase detectors. The calibration sequence, described below, is operated at system power-up and periodically thereafter during operation.

During calibration, microprocessor 26 actuates a synthesized oscillator 28, operating alternately at three different calibration frequencies: the nominal frequency of the incoming signal, and at each of the high and low allowable frequency extremes. In other words, under the control of microprocessor 26, oscillator 28 is alternately tuned to three different calibration frequencies: the nominal transponder reply signal frequency of 1090 MHz, and each of the allowable extreme transponder reply signal frequencies of 1087 MHz and 1093 MHz. The output of oscillator 28 at each of the three calibration frequencies is applied in turn to energize each of the antenna elements at the calibration frequency. The calibration frequencies are transmitted to respective antenna elements E1 through E4 by transmitters TX1 through TX4, which are coupled by respective transmission lines L1 through L4 to respective antenna elements E1 through E4. Direction finding receiving system 10 typically includes a circuit 30, such as a transmit/receive switch, that isolates each transmit path from the receive path during the transmit mode to prevent damage to the sensitive equipment. The signal received by each of the other antenna elements in the interferometer array is compared to an appropriate reference phase. Based upon the comparison data, a library of correction factors corresponding to the full spectrum of allowable transponder reply signal frequencies, i.e., the frequencies between the allowable high and low extremes, is generated for each transmission channel A through D.

In operation, oscillator 28 is tuned in turn to the nominal reply signal frequency and each of the extreme reply signal frequencies. Each of these calibration frequencies output by oscillator 28 is split four ways and applied to the input of each transmitter TX1 through TX4. Each transmitter TX1 through TX4 is independently modulated by a modulation means (not shown) under the control of microprocessor 26. Transmitters TX1 through TX4 are coupled by respective transmission lines L1 through L4 to respective antenna elements E1 through E4. Thus, different transmitters TX1 through TX4 energize different antenna elements E1 through E4 with the calibration signal output by oscillator 28.

Figure 3:
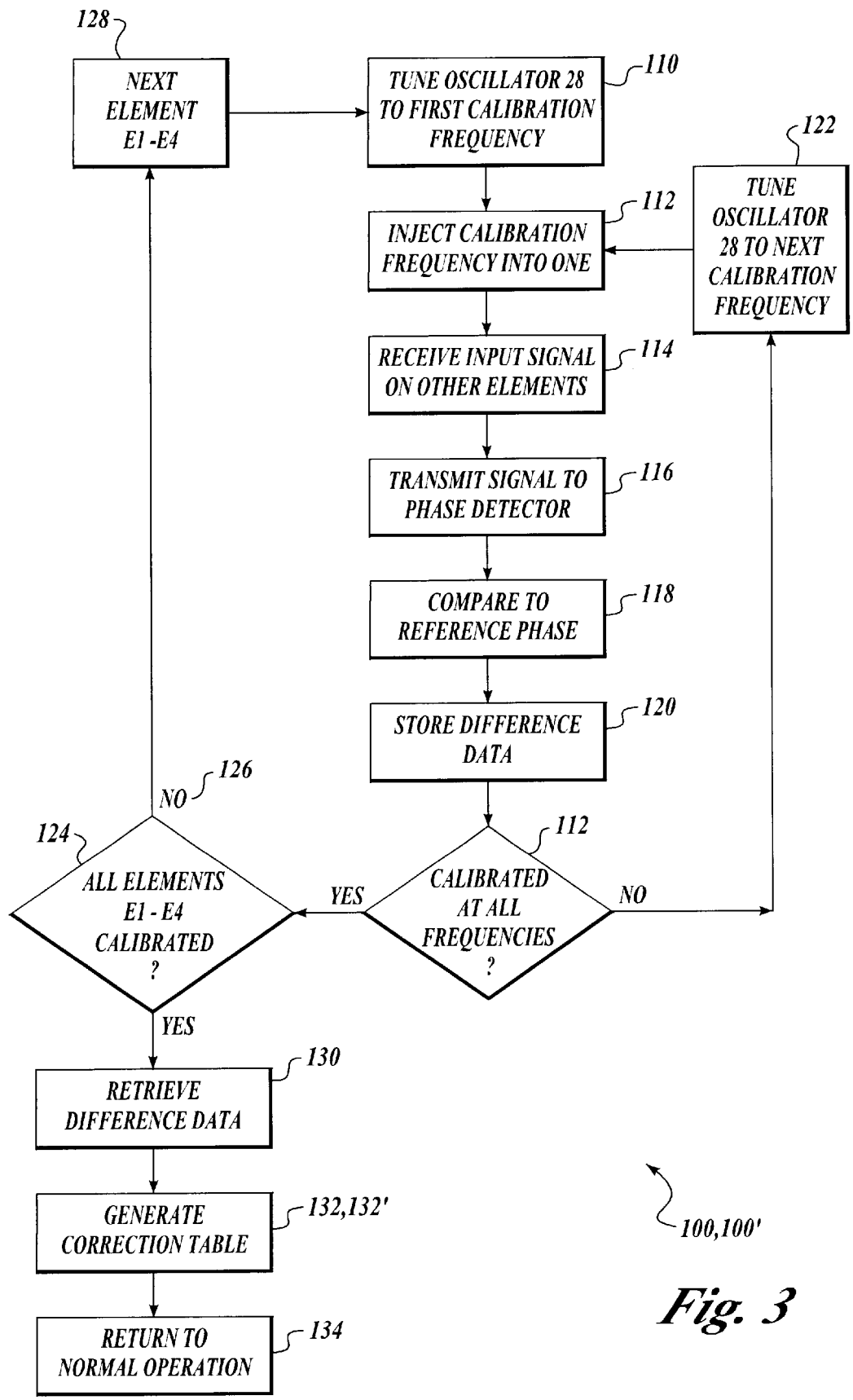
FIG. 3 is a block diagram illustrating two different calibration methods of the invention.

FIG. 3 is a block diagram illustrating two different calibration methods 100 and 100', respectively, of the invention. During one exemplary phase of calibration shown in Block 110, transmitter TX1 energizes one antenna element E1, with a first output of oscillator 28, such as the nominal transponder reply frequency of 1090 MHz. When antenna element E1 is so energized in Block 112, each of the other antenna elements E2, E3, and E4 receive the calibration signal output by energized antenna element E1, as shown in Block 114. In Block 116, the calibration signals received by other elements E2, E3, and E4 are respectively transmitted through transmission lines L2, L3 and L4 and through respective receiver channels RX2, RX3, and RX4, and simultaneously applied to different variable phase inputs of digital phase detector 22.

In Block 118, each of the received signals are compared to a reference phase from source 24. Any phase difference measured by phase detector 22 between one of the various inputs and the phase reference is due to the difference in phase delay between respective transmissions channels B, C, and D, and the phase reference. In Block 120, the phase difference data are stored in a library file at a particular location in an input memory 32, preferably as a function of signal frequency. The stored data are processed, as later described, by microprocessor 26 to provide calibration data.

Under the control of microprocessor 26, oscillator 28 generates a next or second one of the three calibration frequencies, such as an extreme low transponder reply frequency of 1087 MHz, as shown in Block 122. Transmitter TX1 injects the output of oscillator 28 into antenna element E1, to energize the element. Each of the other antenna elements E2, E3, and E4 receive the calibration signal, and each received signal is respectively conducted through transmission lines L2, L3 and L4 and through respective receiver channels B, C, and D to the variable phase inputs of digital phase detector 22. Any phase difference between the inputs and a reference phase are measured by phase detector 22, and the data are stored in input memory 32. Microprocessor 26 directs oscillator 28 to generate a next calibration signal, the third, such as an extreme high transponder reply frequency of 1093 MHz, which is used by transmitter TX1 to energize antenna element E1 again. The signals received by the other antenna elements E2, E3 and E4 are transmitted to digital phase detector 22, which measures the difference between these inputs and a reference phase. Again, the data are stored in a library file in input memory 32, also preferably as function of signal frequency.

During subsequent calibration phases as demonstrated in Blocks 124, 126 and 128, under the control of microprocessor 26, transmitters TX2 through TX4 alternately energize respective antenna elements E2, E3, and E4 with the three calibration signals output by oscillator 28. The signals are received by the other non-energized antenna elements and conducted through respective transmission lines and receiver channels to the variable phase inputs of digital phase detector 22. The received signals are compared to a corresponding reference phase from source 24, and any phase difference between the inputs measured by phase detector 22 is due to the difference in phase delay between respective transmissions channels A, B, C, or D, and the phase reference. The data are cross-referenced to the input signal frequency and stored in a library file at a particular location in input memory 32 for use by microprocessor 26 to develop correction factors for respective channels A through D.

In Block 130, microprocessor 26 accesses the phase difference data in the library files to generate a look-up table of phase correction factors. Thus, in Block 132, microprocessor 26 operates a known algorithm in software that determines phase correction factors based on the differences between the signal received on each individual transmission channel A through D and the reference phase corresponding to the various calibration frequencies. Thus, microprocessor 26 determines phase correction factors corresponding to each of the antenna elements at each of the three calibration frequencies.

Microprocessor 26 stores the results in a look-up table, preferably at a particular location in memory 32. The phase correction factors are used to correct the outputs of transmission channels A through D during the subsequent bearing measurement process. Accordingly, the phase correction factors are preferably referenced in the look-up table by corresponding input signal frequency so that the microprocessor can accesses the look-up table as a function of the determined frequency of the received signal.

Alternatively, in alternative Block 132', microprocessor 26 computes a corrected phase for each possible input signal frequency in incremental steps, such as 1 Hz or 10 Hz increments. Thus, microprocessor 26 computes phase corrected I and Q data corresponding to any possible input signal frequency.

Microprocessor 26 stores the phase corrected I and Q data in a look-up table as a function of the input signal frequency. During normal operation, microprocessor 26 accesses the corrected data as a function of the input signal frequency as determined by the frequency discriminator, and uses the corrected data in computing the bearing angle beta.

After the phase detector calibration is completed and the transmission line phase delay correction factors or alternative phase corrected I and Q data are determined for each transmission channel A through D, as described above, the system is returned to normal operation, as shown in Block 134.

Angle of Arrival Conversion and Calculation

Figure 4:
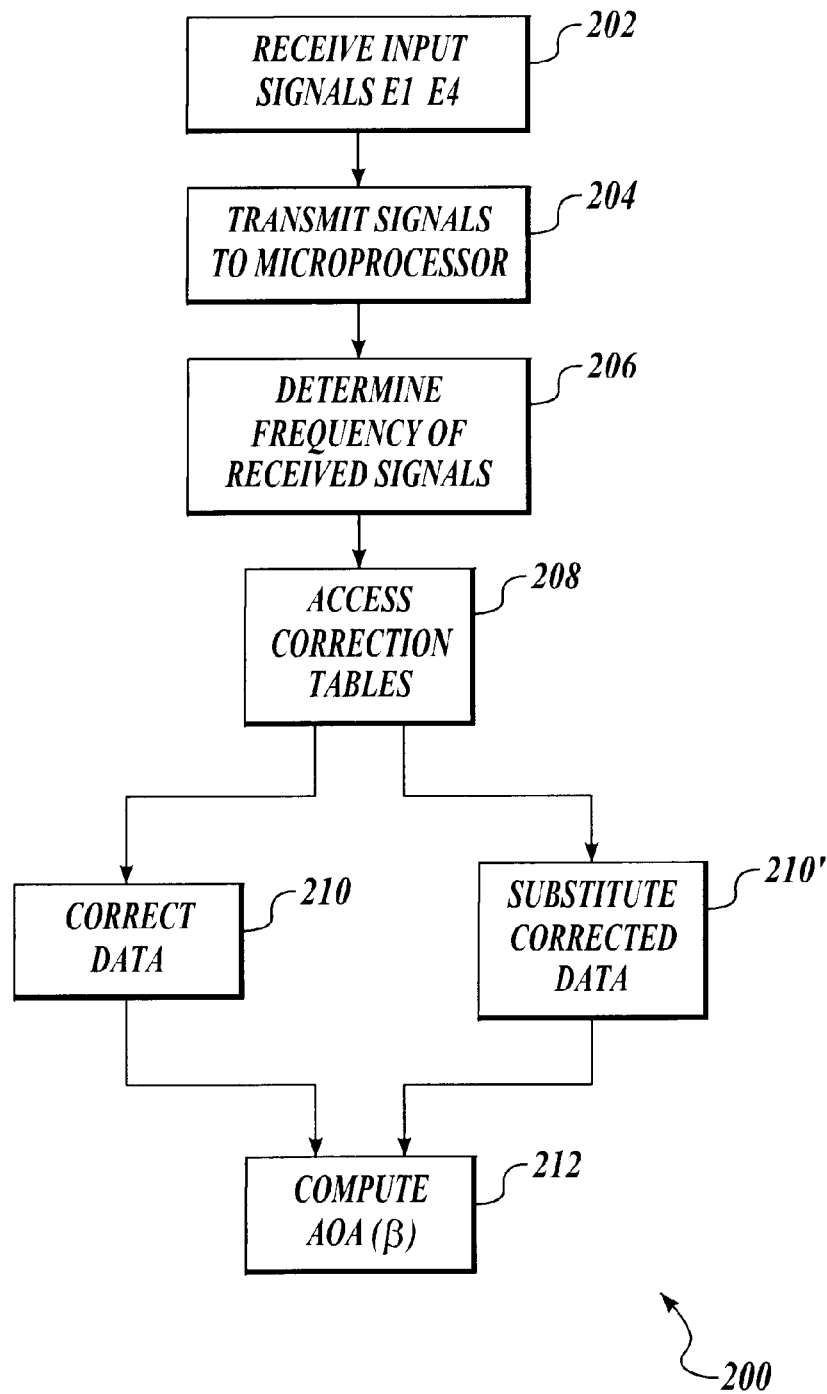
FIG. 4 illustrates two alternative methods of the invention for measuring the bearing angle beta of an intruder aircraft relative to the protected aircraft.

FIG. 4 illustrates the method 200 of the invention for measuring the bearing angle beta of an intruder aircraft relative to the TCAS aircraft. According to the invention, the I and Q samples from digital phase detector 22 are corrected by microprocessor 26 before measurement of the bearing angle beta. In Block 202 of FIG. 4, the transponder reply signals from an intruder aircraft are received on interferometer antenna elements E1 through E4. The received signals are transmitted on respective transmission channels A through D to microprocessor 26, as shown in Block 204. Microprocessor 26 receives the transmitted signals, and as shown in Block 206, passes successive samples of the signal to the frequency discriminator. The frequency discriminator measures the rate of change of phase of the received signals relative to time to determine the frequency of the received signal. The determined frequency of the received signal is used to accesses the look-up table of phase correction factors and to obtain a corresponding correction factor. Microprocessor 26 subsequently compensates the phase of the I and Q samples received on each of transmission channels A through D relative to the phase reference using the respective correction factors. In Block 210, microprocessor 26 corrects the received signals by subtracting the corresponding phase correction factor from each of the received signals.

Alternatively, the phase correction data stored in memory 32 and accessed by microprocessor 26 in Block 208 is phase corrected data, as described in connection with Block 132' of method 100' shown in FIG. 3. Accordingly, the frequency of each signal received on transmission channels A through D is used to address phase correction tables, respectively, to obtain I and Q data, each of which includes corrections for phase non-linearities, as described above. According to this alternative configuration, the step of correcting the data described in Block 210 is modified. Rather than computing a corrected signal as shown in Block 210, in Block 210' phase corrected data is substituted for the received input signal as a function of the I and Q data received from digital phase detector 22.

In Block 212, the corrected I and Q data are used to compute the bearing angle beta. The angle beta is calculated using known methods, such as are described in above incorporated U.S. Pat. No. 4,855,748. The computation described in U.S. Pat. No. 4,855,748 is based on using the phase of the signal at each of first and third receivers RX1 and RX3 relative to second and fourth receivers RX2 and RX4. According to the computation of U.S. Pat. No. 4,855,748, the phase difference between RX1 and RX3 was measured directly. According to the present invention, the phase between RX1 and RX3 is computed by subtracting the phase of RX3 measured relative to the reference phase from the phase of RE4 also as measured relative to the reference phase. Therefore, when the bearing angle computation described in U.S. Pat. No. 4,855,748 is used, the previously determined phase of each incoming signal relative to the reference phase is converted to the above and substituted therefore.

It will be understood that the system of the invention interfaces with the computer of the TCAS system aboard the protected aircraft to provide the additional information of the bearing angle beta of an intruder aircraft 14 which is utilized by the TCAS computer, along with other information, to assess the collision threat of the intruder aircraft 14. Neither the interface nor the TCAS computer forms a part of the present invention. Furthermore, while the invention has bee described and illustrated according to a TCAS implementation, the invention is equally useful for calibrating and operating other interferometer-type direction finding antenna systems. Therefore, the invention contemplates all such applications and implementations being within the scope of the claims.

While the preferred embodiment of the invention has been illustrated and described, it will be appreciated that various changes can be made therein without departing from the spirit and scope of the invention.

What is claimed is:

1. A direction finding antenna system for determining the relative bearing of a signal received by said antenna system, comprising
    two pair of spaced apart antenna elements forming respective mutually perpendicular bisecting axes, said antenna elements receiving a signal;
    a digital phase detector having a variable phase input port coupled via a transmission channel to the output of each said antenna element and a reference phase input port coupled to a phase generator;
    frequency discriminator coupled to the output of said digital phase detector; and
    a processor coupled to the output of said frequency discriminator, said processor determining phase corrected data corresponding to signals output by respective ones of said antenna elements and determining a quantity related to the relative bearing to said received signal from the antenna system.

2. The antenna system recited in claim 1, wherein each said transmission channel further comprises:
    a transmission line coupling an output of each of said antenna elements to an input of a respective receiver element; and
    an analog-to-digital converter coupled between the output of said receiver element and a respective one of said variable phase input ports.

3. A direction finding antenna system for determining the relative bearing of a signal received by said antenna system, comprising
    two pair of spaced apart antenna elements forming respective mutually perpendicular bisecting axes, said antenna elements receiving a signal;
    a transmission line coupling an output of each of said antenna elements to an input of a respective receiver element;
    an analog-to-digital converter coupled to the output of each of said receiver elements;
    a digital phase detector having a variable phase input port coupled to the output of each said analog-to-digital converters and a reference phase input port coupled to a reference phase generator;
    frequency discriminator coupled to the output of said digital phase detector; and
    a processor coupled to the output of said frequency discriminator, said processor determining phase corrected data corresponding to signals output by respective ones of said antenna elements and determining a quantity related to the relative bearing to said received signal from the antenna system.

4. The antenna system recited in claim 3, further comprising:
    a transmitter coupled to each said antenna element via a respective one of said transmission lines; and
    a calibration signal alternately coupled to an input of each said transmitter.

5. The antenna system recited in claim 4, further comprising a modulator coupled to each said transmitter.

6. The antenna system recited in claim 5, further comprising:
    a memory coupled to said processor; and
    correction data stored at a location in said memory.

7. The antenna system recited in claim 6, wherein said location of said correction data in said memory is a function of a frequency of said received signal as determined by said frequency discriminator.

8. The antenna system recited in claim 7, wherein said correction data further comprises one of a correction factor and a phase corrected value.

9. The antenna system recited in claim 8, wherein said calibration signal further comprises a plurality of calibration signals including at least a first signal having a frequency essentially the same as a minimum extreme of a range of said received signal and a second signal having a frequency essentially the same as a maximum extreme of said range of said received signal.

10. A direction finding antenna system for determining the relative bearing of a signal received by said antenna system, comprising
    first, second, third and fourth spaced apart antennas mounted in cruciform configuration;
    first, second, third and fourth receivers coupled to respective ones of said first, second, third and fourth antennas for amplifying, converting and limiting radio frequency signals received by said first, second, third and fourth antennas;
    first, second, third and fourth analog-to-digital converters coupled to receive the output of respective ones of said first, second, third and fourth receivers, each of said first, second, third and fourth analog-to-digital converters outputting sequential output signals;
    a digital phase detector having a plurality of variable phase input ports each coupled to simultaneously receive said sequential output signals of respective ones of said first, second, third and fourth analog-to-digital converters and a reference phase input port coupled to a reference phase generator for receiving a reference phase output signal thereof, said digital phase detector generating I and Q data from said reference phase and respective ones of said signals received by said first, second, third and fourth antennas; and
    a processor coupled to receive said I and Q data from said digital phase detector, said processor including a frequency discriminator for comparing sequential output signals of respective ones of said first, second, third and fourth analog-to-digital converters and determining a frequency of each said output signals, said processor determining phase corrected values of said I and Q data and determining a first quantity related to the relative bearing to the received signal from the antenna system as a function of said phase corrected values.

11. The antenna system recited in claim 10, further comprising:
    a synthesizer generating a plurality of calibration signals at different frequencies; and
    a transmitter coupled to said synthesizer and to one of said antennas for injecting a calibration signal into said antenna.

12. The antenna system recited in claim 11, further comprising a modulator coupled to said transmitter and each of said antennas for alternately applying calibration signals to different ones of said antennas.

13. The antenna system recited in claim 12, further comprising an input memory coupled to said processor and having correction data stored therein, said processor accessing said correction data for determining said phase corrected values of said I and Q data.

14. The antenna system recited in claim 13, wherein said correction data stored in said memory is accessed by said processor as a function of said frequency of said output signals.

15. The antenna system recited in claim 14, wherein said correction data further comprises one or more correction factors.

16. The antenna system recited in claim 14, wherein said correction data further comprises one or more phase corrected values.

17. The antenna system recited in claim 14, wherein said plurality of calibration signals further comprises at least a first signal having a low frequency relative to a nominal value of said received signal and a second signal having a high frequency relative to said nominal value.

18. The antenna system recited in claim 14, wherein said low frequency further comprises a minimum of an allowable range of said received signal and said high frequency further comprises a maximum of said allowable range of said received signal.

19. The antenna system recited in claim 18, wherein said received signal is a transponder signal in the range of 1087 MHz to 1093 MHz.

20. A method for using a direction finding antenna system for determining the relative bearing of a received signal, the method comprising:
    receiving a signal into a plurality of spaced apart antenna elements mounted in cruciform configuration;
    forming a digital intermediate frequency output signal from said received signal;
    comparing a phase of said digital intermediate frequency output signal with a reference phase;
    determining a frequency of said intermediate frequency output signal;
    determining phase corrected values of said received signal; and
    determining a quantity related to the relative bearing to the received signal using said phase corrected values.

21. The method recited in claim 20, wherein said forming a digital intermediate frequency output signal from said received signal further comprises:
    forming an analog intermediate frequency output signal from said received signal; and
    converting said analog intermediate frequency output signal into said digital intermediate frequency output signal.

22. The method recited in claim 21, further comprising forming in-phase and in-quadrature data from said digital intermediate frequency output signal and said reference phase.

23. The method recited in claim 22, wherein said determining phase corrected values of said received signal further comprises accessing a stored file comprising correction data.

24. The method recited in claim 23, wherein said accessing a stored file comprising correction data further comprises accessing said stored file comprising correction data as a function of said frequency of said intermediate frequency output signal.

25. A method for using a direction finding antenna system for determining the relative bearing of a received signal, the method comprising:
    receiving a signal into a plurality of spaced apart antenna elements mounted in cruciform configuration;
    amplifying, converting and limiting said received signal and forming an analog intermediate frequency output signal therefrom;
    converting said analog intermediate frequency output signal into a digital intermediate frequency output signal and outputting samples of said digital intermediate frequency output signal;
    comparing the phase of said digital intermediate frequency output signal samples with a reference phase to form in-phase and in-quadrature data therefrom;
    determining a frequency of said digital intermediate frequency output signal samples;
    determining phase corrected values of said in-phase and in-quadrature data; and
    determining a first quantity related to the relative bearing to the received signal as a function of said phase corrected values.

26. The method recited in claim 25, wherein said determining phase corrected values of said in-phase and in-quadrature data further comprises accessing a stored file comprising correction data.

27. The method recited in claim 26, wherein said determining phase corrected values of said in-phase and in-quadrature data further comprises accessing said stored file comprising correction data as a function of said frequency of said digital intermediate frequency output signal samples.

28. The method recited in claim 27, wherein said determining phase corrected values of said in-phase and in-quadrature data further comprises combining said correction data with said in-phase and in-quadrature data formed from said digital intermediate frequency output signal samples and said reference phase.

29. The method recited in claim 27, wherein said determining phase corrected values of said in-phase and in-quadrature data further comprises substituting said correction data for said in-phase and in-quadrature data formed from said digital intermediate frequency output signal samples and said reference phase.

30. A method for calibrating a direction finding antenna system, the method comprising:
    injecting a calibration signal into one of a plurality of antenna elements;
    receiving said calibration signal into a different one of said antenna elements;
    outputting a digital intermediate frequency signal formed of said received calibration signal;
    determining a frequency of said digital intermediate frequency signal;
    comparing a phase of said digital intermediate frequency signal to a reference phase; and
    determining phase correction data corresponding to said digital intermediate frequency signal.

31. The calibration method recited in claim 30, wherein said calibration signal further comprises a plurality of calibration signals.

32. The calibration method recited in claim 31, wherein each of said plurality of calibration signals further comprises a frequency signal having a frequency in the permissible range of frequencies of the received signal.

33. The calibration method recited in claim 30, further comprising storing said phase correction data.

34. The calibration method recited in claim 30, further comprising storing said phase correction data as a function of a corresponding one of said digital intermediate frequency signals.

35. The calibration method recited in claim 30, wherein said outputting a digital intermediate frequency signal formed of said received calibration signal further comprises:
  forming an analog intermediate frequency signal of said received calibration signal; and
  converting said analog intermediate frequency signal into a digital intermediate frequency signal.

36. The calibration method recited in claim 30, wherein said comparing a phase of said digital intermediate frequency signal to a reference phase further comprises forming in-phase and in-quadrature data therefrom.

37. A method for calibrating a direction finding antenna system, the method comprising:
  alternately injecting a calibration signal into different ones of a plurality of antenna elements;
  receiving said calibration signal into others of said antenna elements;
  amplifying, converting and limiting said received calibration signal and forming an analog intermediate frequency output signal therefrom;
  converting said analog intermediate frequency output signal into a digital intermediate frequency output signal and outputting samples of said digital intermediate frequency output signal;
  determining the frequency of said digital intermediate frequency output signal samples;
  comparing the phase of said digital intermediate frequency output signal samples with a reference phase to form in-phase and in-quadrature data therefrom; and
  determining phase correction data corresponding to said in-phase and in-quadrature data and storing same.

38. The calibration method recited in claim 37, wherein said storing said phase correction data further comprises storing said phase correction data as a function of said intermediate frequency.

39. The calibration method recited in claim 38, wherein said injecting a calibration signal further comprises injecting a plurality of calibration signals.

40. The calibration method recited in claim 39, wherein said plurality of calibration signals further comprises a minimum and a maximum of an allowable range of frequencies of said received signal.

41. The calibration method recited in claim 39, wherein said injecting a calibration signal into one of a plurality of antenna elements further comprises alternately injecting said calibration signal into different ones of said others of said antenna elements.

42. A direction finding antenna system for determining the relative bearing of an intruder aircraft from a protected aircraft in conjunction with a Traffic Alert Collision Avoidance System (TCAS), the intruder aircraft being equipped to transmit signals received by said antenna system, the direction finding antenna system comprising:
  two pair of spaced apart antenna elements formed in cruciform configuration to receive a radio frequency signal;
  each one of a plurality of receiver elements coupled via a different transmission line to a different one of said antenna elements;
  each one of a plurality of analog-to-digital converters coupled to receive the output of a respective one of said receiver elements;
  a digital phase detector having a plurality of variable phase input ports each coupled to the output of one of said analog-to-digital converters and a reference phase input port coupled to receive the output of a reference phase generator;
  a frequency discriminator coupled to receive the output of said digital phase detector;
  a processor coupled to receive the output of said frequency discriminator, said processor determining phase corrected data corresponding to signals output by respective ones of said antenna elements and determining a relative bearing angle to said received radio frequency signal from the antenna system; and
  a Traffic Alert Collision Avoidance System coupled to receive said relative bearing angle.

43. The direction finding antenna system recited in claim 42, further comprising:
  a transmitter coupled to each said antenna element via a respective one of said transmission lines; and
  a calibration signal generator alternately coupled to an input of each said transmitter.

44. The direction finding antenna system recited in claim 43, further comprising a modulator coupled to each said transmitter for alternately coupling said calibration signal generator to an input of each said transmitter.

45. The direction finding antenna system recited in claim 44, further comprising:
  a memory coupled to said processor; and
  correction data stored at a location in said memory.

46. The direction finding antenna system recited in claim 45, wherein said location of said correction data in said memory is determined as a function of a frequency of said received signal as determined by said frequency discriminator.

* * * * *